United States Patent [19]

Stone et al.

[11] Patent Number: 4,926,991
[45] Date of Patent: May 22, 1990

[54] ACTUATED SPRING CLUTCH ASSEMBLY

[75] Inventors: Robert A. Stone, Sandy Hook; Jules G. Kish, West Haven, both of Conn.

[73] Assignee: United Technologies Corporation, Hartford, Conn.

[21] Appl. No.: 288,410

[22] Filed: Dec. 21, 1988

[51] Int. Cl.$^5$ .................. F16D 11/06; F16D 13/06
[52] U.S. Cl. ................................ 192/41 S; 192/75
[58] Field of Search ............... 192/41 S, 26, 33 C, 192/74, 75

[56] References Cited

U.S. PATENT DOCUMENTS

| | | | |
|---|---|---|---|
| 2,030,333 | 2/1936 | Starkey | 192/415 |
| 2,548,747 | 4/1951 | Starkey | 192/413 |
| 2,571,232 | 10/1951 | Gorske | 192/41 |
| 2,595,454 | 5/1952 | Greenlee | 64/30 |
| 2,598,993 | 6/1952 | Gorske | 192/41 S |
| 2,700,442 | 1/1955 | Gorske | 192/47 |
| 3,298,486 | 1/1967 | Perryman | 192/47 |
| 4,570,318 | 2/1986 | Kish | 29/173 |
| 4,583,628 | 4/1986 | McCormick | 192/76 |

Primary Examiner—Rodney H. Bonck
Assistant Examiner—Andrea Pitts
Attorney, Agent, or Firm—Darby & Darby

[57] ABSTRACT

A spring clutch assembly has an input clutch member (2), an output clutch member (3), and a spring (12) disposed over a coaxial arbor (9). The spring clutch assembly further includes an independently rotatable shaft (16) disposed in a passage extending through the arbor. The shaft includes a splined surface (19) engaged by an axially movable collar (23) having a mating splined surface. The collar is mounted a chamber (20) in the input member, and has extending ears (25) and (26) located in slots (21) and (22) in the chamber sidewall. A cap (30) is fitted to an output end of the shaft and has an arm (38) extending into engagement with an end coil (41). The arm includes a projection which engages a recess in the coil. Axial movement of the collar causes the shaft to turn, relative to the arbor, with the arm forcing the coil spring to compress, disengaging the teaser coils from the output drive surface. Utilizing a shaft assembly for manual clutch disengagement allows the input member to be rotated without rotating the output member.

9 Claims, 2 Drawing Sheets

൪,൯൨൬,൯൯൧

ACTUATED SPRING CLUTCH ASSEMBLY

TECHNICAL FIELD

This invention relates to spring clutches assemblies including means for manually disengaging a drive member from a driven member.

BACKGROUND

Spring clutch assemblies, such as that disclosed in U.S. Pat. No. 4,570,318 to Kish, are known for transferring torque from a drive member to a driven member, with spring clutch assemblies preferred as torque transmitting devices where overrunning conditions would be encountered. Such conditions occur when the driven member attains a higher rotational speed than the drive member and therefore declutching is required to prevent rotation of the driver. Overrunning spring clutches utilize a coil spring which expands radially under a driven load to couple two clutch members, an input member and an output member. Each clutch member includes a bore where the coil spring is located, with approximately one half of the spring in the input member and one half in the output member. The clutch spring is usually fixed at the drive end by press fitting onto an arbor which is attached to the input member. The arbor is coaxial with the input and output members, passing through the hollow core of the spring. The arbor serves as a centering means for alignment and support of the coil spring.

In the non-rotating state, a space is provided between the spring and the inner bore surfaces of the clutch members, except at the ends where "teaser" coils are in contact with the inner surfaces. These teaser coils ride on the surfaces to actuate the spring. When the input member begins to rotate, in a direction counter to the pitch of the spring coils, the teaser coils, dragging against the output member, cause the spring to unwind, expanding radially so that it is in driving contact with the bore surfaces along its entire length, transferring torque from the input to the output member.

In the overrunning condition, the driven member rotates faster than the drive member, in the direction of the spring pitch, driving the teaser coils to rewind the spring and disengage the driven member from the drive member. This may occur, for example, in a helicopter during engine shutdown when momentum maintains main rotor rotation.

A problem with spring clutches is their inability to be disengaged in a non-overrunning condition. For example, on a helicopter, it may be desirable to use the driver to power auxiliary devices or to conduct equipment checks, without rotating the rotors. Spring clutch assemblies operate automatically in response to rotation of the driver and are not disengageable on command. Additional devices, such as an auxillary clutch, may be used to disengage the driver, however, these would add excessive weight and complexity to the aircraft.

SUMMARY OF THE INVENTION

It is an object of the present invention to provide a spring clutch assembly which allows disengagement of the primary power train in a non-overrunning condition.

It is another object of the present invention to provide means for disengaging the drive train without adding excessive weight and complexity to the spring clutch assembly.

It is a further object of the present invention to provide means for disengaging the primary drive train without interfering with the normal overrunning capability of the spring clutch assembly.

According to the present invention, an overrunning spring clutch assembly is disclosed which has an input clutch member, an output clutch member, a centrally disposed arbor, and a coil spring placed on the arbor. The spring clutch assembly further comprises a rotatable shaft extending through an arbor passage, from the input clutch member through the output clutch member. Rotating means are engaged with the shaft for rotating the shaft relative to the arbor. The shaft further has spring engagement means fixed at an outward end, which engages an end coil of the spring. When the shaft is rotated from a first position to a second position, the spring engagement means winds the spring in the direction of the spring pitch to disengage the teaser coils from the output member. This allows the input member to rotate freely, without causing rotation of the output member. Consequently, auxiliary devices may be run with the driver disengaged. Returning the rotating means to the first position unwinds the spring to return the teaser coils to contact with the output member, allowing the spring to function normally.

DETAILED DESCRIPTION OF THE INVENTION

Figure 1:
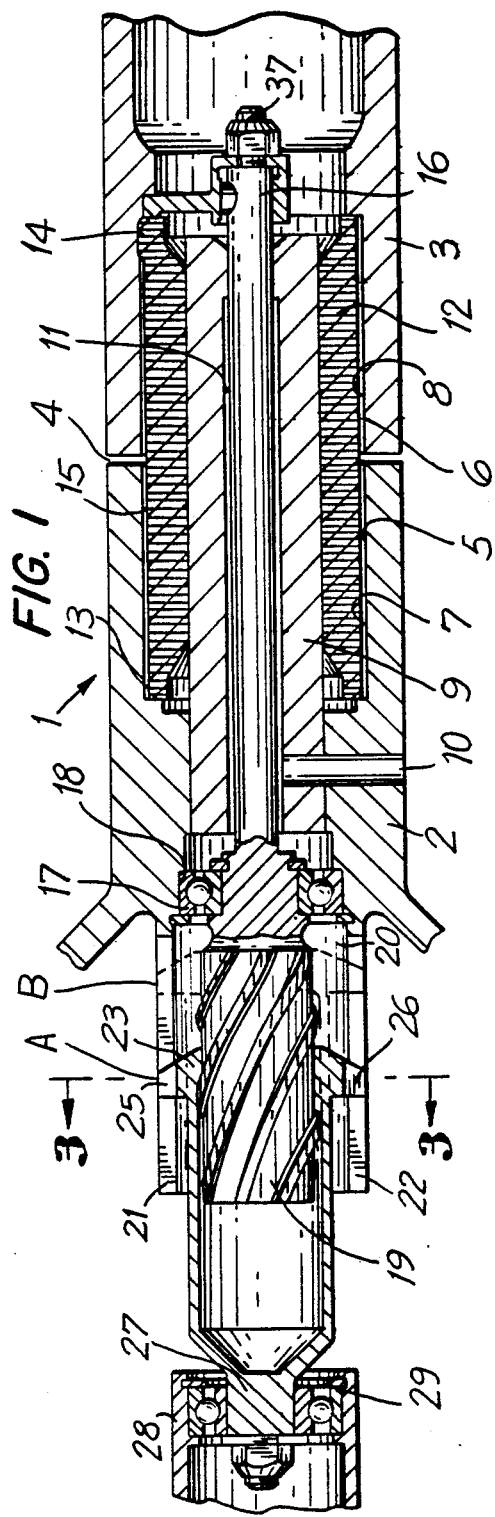
FIG. 1 is a cross-sectional view of the actuated spring clutch of the present invention.

FIG. 1 is a cross-sectional view of the actuated spring clutch assembly of the present invention. "Actuated" refers to the ability to disengage the spring clutch on command. The spring clutch assembly 1 includes an input clutch member 2 and an output clutch member 3. The clutch members are disposed in a housing which has not been shown to ease illustration of the invention. The input and output members are generally cylindrical in shape and are placed in end-to-end juxtaposition with a gap 4 therebetween, each clutch member being independently rotatable. The input and output clutch members have bores 5 and 6, respectively, extending axially therethrough. The bores 5 and 6 provide input and output drive surfaces 7 and 8 for spring engagement. The input member is engaged by a drive device (not shown) such as a gas turbine engine. The output member is engaged to a driven device (not shown) such as a helicopter rotor.

An arbor 9 is coaxially disposed in the assembly, extending through the bores in both members. The arbor 9 is attached by a pin 10 to the input member and is rotatable therewith. The arbor 9 has a central passage 11 which extends for its length.

A coil spring 12 is placed on the arbor, within the bores of the input and output members. The spring has input teaser coils 13, which contact the input drive surface, output teaser coils 14, which contact the output drive surface and central coils 15 which do not contact the drive surfaces when in the compressed condition yet are expandable into engagement with the drive surfaces for transmitting torque from the drive member to the driven member. The spring has a pitch which causes expansion when the input member rotates faster than the output member, and compression when the output member rotates faster than the input member.

A shaft 16 extends through the passage 11 in the arbor, and is rotatable therein. Bearings 17 are provided in a recess 18 in the input member bore for rotatably supporting the shaft. The shaft is therefore rotatable, relative to the arbor/input member subassembly. The shaft has a helically splined end 19 which extends through a chamber 20 in the input member. The chamber is cylindrically shaped and includes two opposed slots 21 and 22, in the wall thereof.

Figure 3:
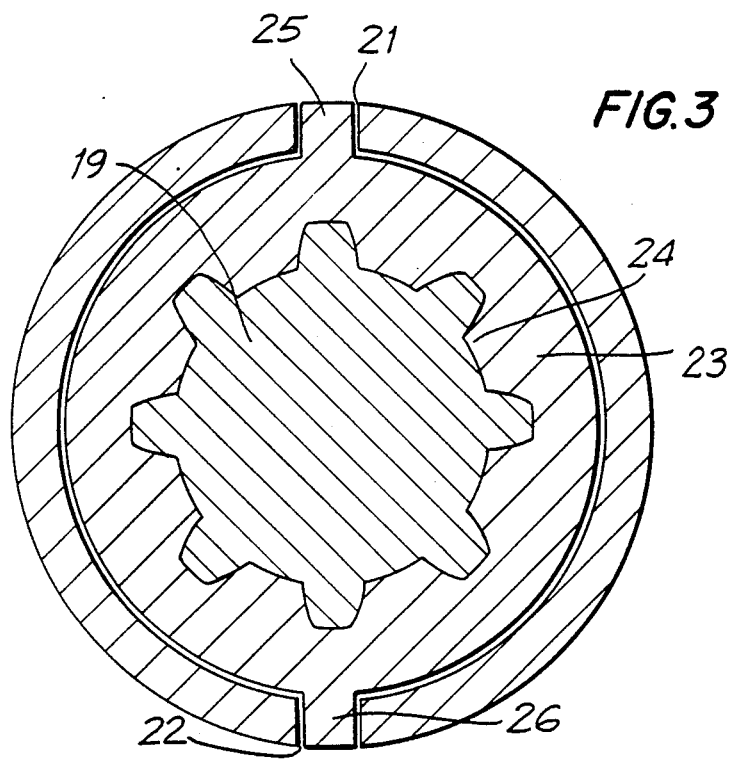
FIG. 3 is a cross-sectional view of the spring clutch assembly line 3—3 of FIG. 1.

A reciprocally movable collar 23 is engaged to the splined shaft end within the chamber. Referring to FIG. 3, the collar 23 includes splines 24 on the inner diameter thereof, which are sized to engage the splined shaft end. The collar includes two opposed ears 25 and 26 which extend into the wall slots 21 and 22, to restrict the collar to axial movement. Referring again to FIG. 1, the collar 23 has an end 27 connected to a reciprocating actuator 28, with the end supported rotatably in the actuator by bearings 29. Linear movement of the collar acts on the shaft splines to twist the shaft, rotating the shaft from a first position (A) to a second position (B), shown in phantom. Generally, helical splines with a particular twist may cooperate with an actuator of a particular stroke to provide precise positioning of the shaft relative to the arbor. The actuator may be electrically, pneumatically or mechanically operated in response to a control signal.

Figure 4:
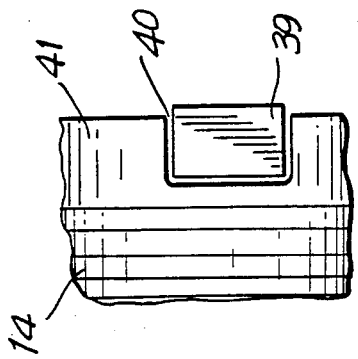
FIG. 4 is an enlarged view of the spring engagement means, taken along line 4—4 of FIG. 2.
Figure 2:
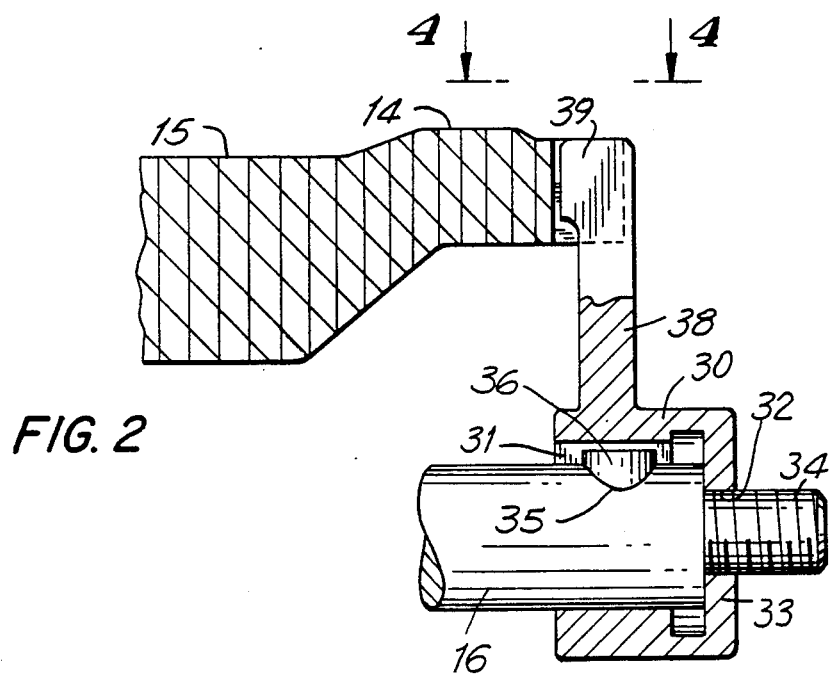
FIG. 2 is an enlarged view of one embodiment of the spring means of the present invention.

Spring engagement means are fitted to a portion of the shaft adjacent the output teaser coils. Referring to FIG. 2, the engagement means comprise a cylindrical cap 30, with a keyway 31 in the sidewall thereof. The cap 30 has a hole 32 in a top portion 33 through which a threaded end 34 of the shaft passes through. The shaft also has a keyway 35 which is aligned with the cap keyway 31. A key 36 is inserted in the keyways to lock the cap to the shaft, with a nut 37 (shown in FIG. 1) fitted to the threaded shaft to prevent axial cap movement. An arm 38 extends from the cap into engagement with the spring. Referring to FIG. 4, the arm has a projection 39 for engaging a rectangular recess or cut-out 40 in an end coil 41. The recess may be provided by modifying the spring to add an end coil of sufficient thickness to allow machining. The end coil is preferably of a smaller outside diameter than the teaser coils and is not in contact with the drive surface. This assures that arm does not interfere with the clutch overrunning capability.

In operation, the input member, arbor and spring rotate as a unit. The shaft similarly rotates with the unit, yet is separably rotatable relative to the arbor. For example, the shaft may be rotated from 0 degrees to 180 degrees, relative to the arbor, while the unit is rotating at 10,000 RPM.

For normal operation, the collar 23 is located at a first position (A) which allows the output teaser coils 14 to engage the output drive surface 8. Therefore, the arm 38 does not interfere with normal operation of the spring clutch assembly and any rotation of the input member results in engagement and rotation of the output member. When it is desired to disengage the output member, for example, for driving auxiliary devices, the actuator 28 receives a signal which drives the actuator to displace the collar 23 axially, causing the collar to move from the first position to a second position (B). As the collar moves axially, the engaged splined surfaces cause rotation of the shaft. The arm 38 then forces the teaser coils 14 to turn in the direction of the spring pitch, causing the spring to compress and thereby disengaging the output teaser coils from the output drive surface. Once contact is broken, the input member may be rotated freely without rotating the output member. In a helicopter, such an assembly allows the engine to drive auxiliary devices such as generators or other items, without requiring main rotor rotation.

While a helically splined shaft is shown, it will be understood by those skilled in the art that various alternative means for rotating the shaft may be used. In addition, it will be understood that various other modifications or changes could be made to the spring engagement means without varying from the present invention.

What is claimed is:

1. A spring clutch assembly having an input clutch member; an output clutch member, the input and output members having bores extending therethrough, each member being separably rotatable; an arbor extending through the bores in both members; a clutch spring placed on the arbor, each member having a drive surface engageable by the spring; the spring clutch assembly further comprising:
    a shaft, disposed in a passage in the arbor, the shaft extending through the arbor and being rotatable therein;
    spring engagement means fixed to the shaft for engaging the spring;
    rotating means, engaged to the shaft, for rotating the shaft relative to the arbor in response to a control signal.

2. The spring clutch assembly of claim 1, wherein the shaft is rotated from a first position to a second position, in response to the control signal, the spring engagement means rotated therewith, the spring having a portion in contact with an output drive surface in the first position, and out of contact with the output drive surface in the second position.

3. A spring clutch assembly having an input clutch member; an output clutch member, the input and output members having bores extending therethrough, each member being separably rotatable; an arbor extending through the bores in both members; a clutch spring placed on the arbor, each member having a drive surface engageable by the spring; the spring clutch assembly further comprises:
    a shaft, disposed in a passage in the arbor, the shaft extending through the arbor and being rotatable therein;
    a spring engagement means fixed to the shaft for engaging the spring;
    rotating means, engaged to the shaft, for rotating the shaft relative to the arbor in the response to the control signal, the rotating means being a splined shaft end and a collar fixed radially to the input member and having a mating splined surface, the collar displaceable axially along the splined surface for rotating the shaft.

4. A spring clutch assembly having an input clutch member; an output clutch member, the input and output members having bores extending therethrough, each member being separably rotatable; an arbor extending through the bores in both members; a clutch spring placed on the arbor, each member having a drive surface engageable by the spring; the spring clutch assembly further comprising:
- a shaft, disposed in a passage in the arbor, the shaft extending through the arbor and being rotatable therein;
- a spring engagement means fixed to the shaft for engaging the spring;
- rotating means, engaged to the shaft, for rotating the shaft relative to the arbor in the response to the control signal, and,
- actuator means for driving the rotating means from a first position to a second position.

5. The spring clutch assembly of claim 4 wherein the actuator means is a pneumatically, electrically or mechanically operated actuator.

6. The spring clutch assembly of claim 4 wherein the shaft is supported by bearings.

7. A spring clutch assembly having an input clutch member; an output clutch member, the input and output members having bores extending therethrough, each member being separably rotatable; an arbor extending through the bores in both members; a clutch spring placed on the arbor, each member having a drive surface engageable by the spring; the spring clutch assembly further comprising:
- a shaft, disposed in a passage in the arbor, the shaft extending through the arbor and being rotatable therein;
- a spring engagement means fixed to the shaft for engaging the spring;
- rotating means, engaged to the shaft, for rotating the shaft relative to the arbor in the response to the control signal, the spring engagement means being a cylindrical cap fixed to the shaft, an arm extending from the cap, the arm including a projection matable with a recess in an end coil.

8. The spring clutch assembly of claim 7 further comprising a key for fixing the cap to the shaft, and a nut threaded onto a threaded portion of the shaft for retaining the cap on the shaft.

9. A method for disengaging a drive member from a driven member in a spring clutch assembly, the assembly having an input clutch member; an output clutch member, the input and output members having bores extending therethrough, each member being separably rotatable; an arbor extending through the bores in both members, with a clutch spring placed on the arbor, each member having a drive surface engageable by the spring; the method comprising:
- providing a shaft, disposed in a passage in the arbor, the shaft extending through the arbor and being rotatable therein;
- engaging an end of the spring with spring engagement means which are fixed to the shaft;
- rotating the shaft relative to the arbor, with rotating means which are engaged to the shaft, in response to a control signal, from a first position to a second position, the spring engagement means rotated therewith, teaser coils of the spring being in contact with an output drive surface in the first position, and out of contact with the output drive surface in the second position.

* * * * *